Figure 1:
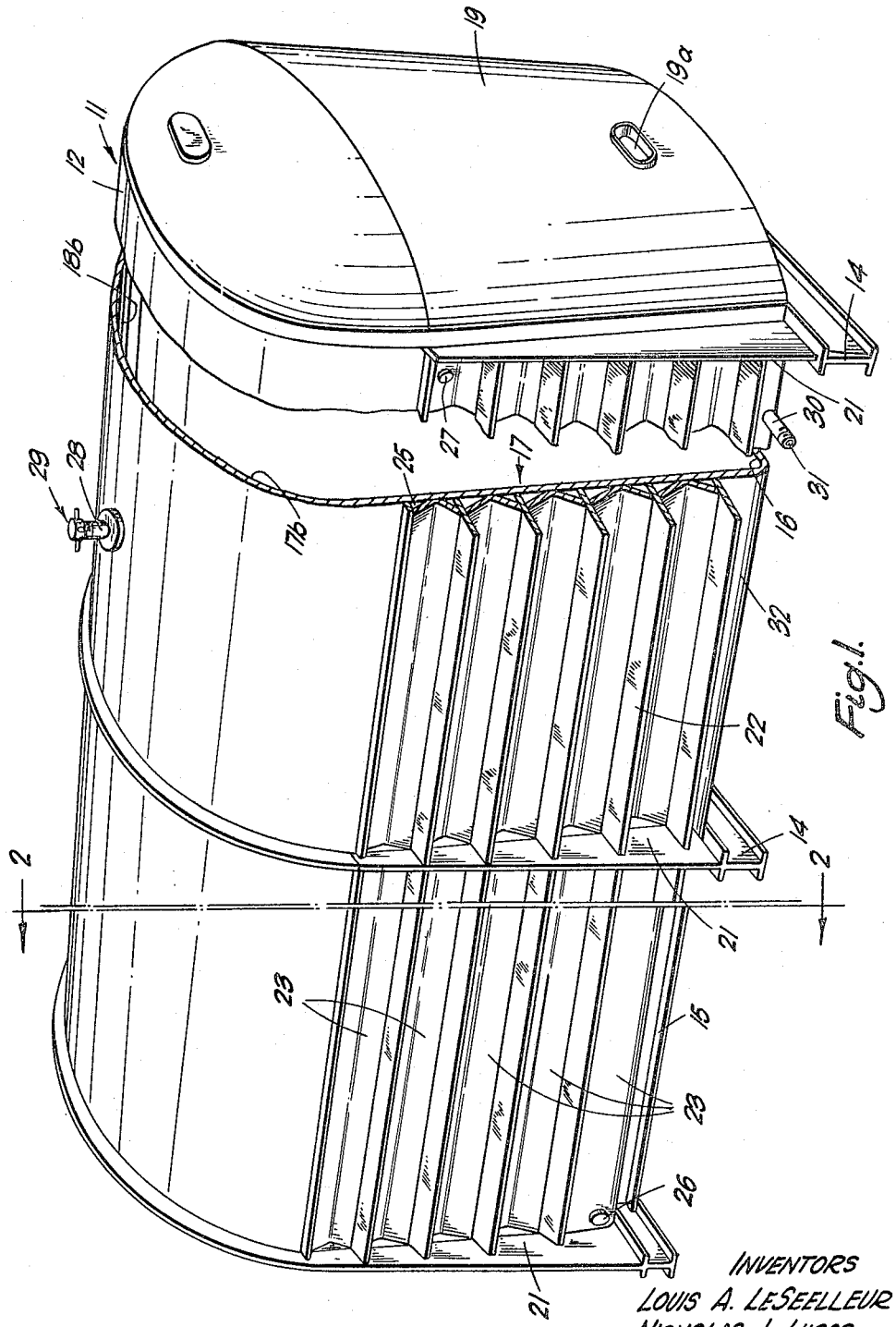

United States Patent Office 3,310,106
Patented Mar. 21, 1967

3,310,106
MULTIPURPOSE PROCESS VESSEL FOR HEAT TRANSFER OPERATIONS
Louis A. Leseelleur and Nicholas J. Lucas, both of London, Ontario, Canada, assignors to John Labatt Limited, London, Ontario, Canada
Filed June 14, 1965, Ser. No. 463,734
Claims priority, application Canada, Sept. 14, 1964, 911,662
11 Claims. (Cl. 165—169)

This invention relates to process vessels and more particularly to closed fermenting and aging vessels for use in the brewing industry.

The fermentation of wort and the aging of beer are perhaps two of the most important steps in the brewing process. Brewers' yeast, having the ability to assimilate simple nitrogenous compounds and reproduce and break down sugars to carbon dioxide and alcohol is introduced into the wort, whereupon through a controlled biological fermentation process, the wort is transformed into beer. The fermentation of wort is usually a batch operation carried out under relatively low pressure (1–3 p.s.i.g.) in large metal fermenting vessels capable of holding thousands of gallons of wort. Heat is produced during fermentation and it is in the control, inter alia, of the temperature of the fermenting wort that the characteristic quality of the resultant brew depends. Upon completion of the fermentation, the beer is cooled in the fermenting vessel prior to undergoing a period of primary storage at pressures considerably greater than those to which the fermentation is subjected. Heretofore, primary storage has been carried out in separate tanks to which the beer is conveyed from the fermenting vessel subsequent to fermentation. The use of separate containers for fermenting and aging was due primarily to the fact that the very large capacity requirements of fermenting vessels (from 20,000–40,000 gallons), the specific design aspects thereof influenced by brewing fermentation techniques, the heat exchange problems attendant upon critical temperature control of a large volume of wort and pressures ranging up to about 15 p.s.i.g. in aging of the beer made it difficult to design a vessel having an economically practical strength to weight ratio which would serve both as a fermenting and a primary storage vessel.

Various types of vessels are known which could be adapted for use in the fermenting of beer, such as the vessel described in United States Patent No. 3,047,190. However, these known vessels are generally inadequate in that the designs in comparable economic limits will not withstand sufficient safety pressures and separate heating jackets and stiffening members are required. Internal heat exchange devices are, of course, unsatisfactory for this purpose because of the cleaning problems that they create.

According to this invention there is provided a processing vessel of generally rectangular, and preferably loaf-shaped, cross-section. Thus, the vessel has a metal bottom, metal top, metal side walls interconnecting the bottom and top, and end members joined to the bottom and top, and end members joined to the bottom, side and top walls to form a closed tank. In order to permit the use of thin walls and minimize the weight of the vessel it is supported on its side and bottom by grid-like networks of structural members. A plurality of vertically extending horizontally spaced reinforcing members are secured to the side walls of the tank and a plurality of horizontally extending vertically spaced stiffening members are provided which extend substantially perpendicularly from the side walls. There are also provided a plurality of horizontally extending members which are angularly connected with the side walls and the horizontally extending stiffening members so as to form longitudinally disposed triangular passages. These triangular passages which are formed from the side walls of the vessel and the stiffening members also serve as heat exchanging jackets for the vessel, so that at least one inlet and one outlet opening is provided into the passage for the introduction and removal of heat exchange fluid and all of the passages on each wall are interconnected so that the fluid can flow from one to another. The passages are preferably interconnected such that the fluid flows to and fro through the passages from top to bottom or bottom to top. The interconnection of the triangular passages formed by the stiffening members and the horizontal members angularly disposed thereto formed the heat exchange jacket on the side walls of the closed tank may suitably be effected by cutting away a portion of the stiffening members alternately adjacent each endmost vertical reinforcing member and flaring the end of the angularly disposed horizontal members away from the side walls of the container and into sealing abutment with the vertically extending reinforcing members. Closeable openings must, of course, also be provided in the vessel for introducing material into the confines thereof and for withdrawing material therefrom.

The present invention thus provides a processing vessel having a smooth easily cleanable interior, a simple design, efficient heat transfer directly on the flat walls of the vessel, and the capability to withstand sufficient pressures, while having an exceptionally low weight to strength ratio. Thus, the process vessel according to this invention combines all of the essential features necessary to permit it to be used as both a fermentation and aging vessel while at the same time incorporating unique structural features which result in an economically practical strength to weight ratio.

Figure 2:
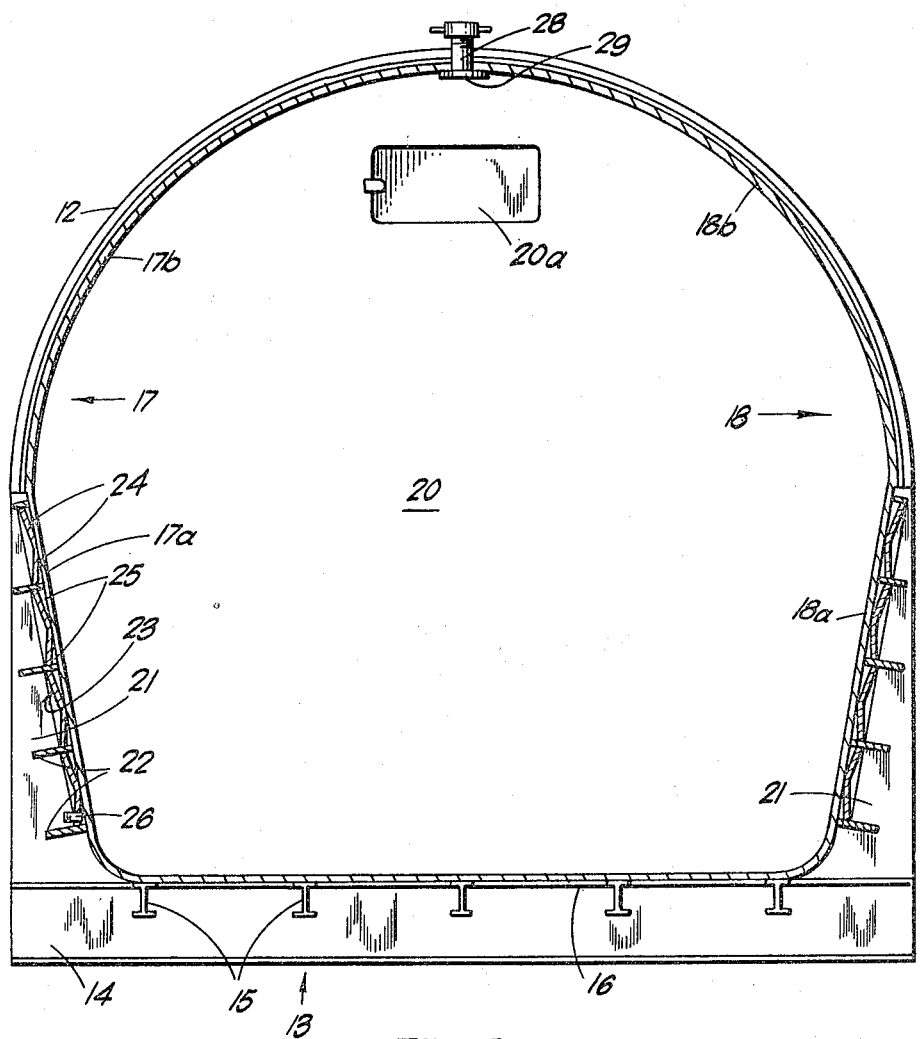
Figure 3:
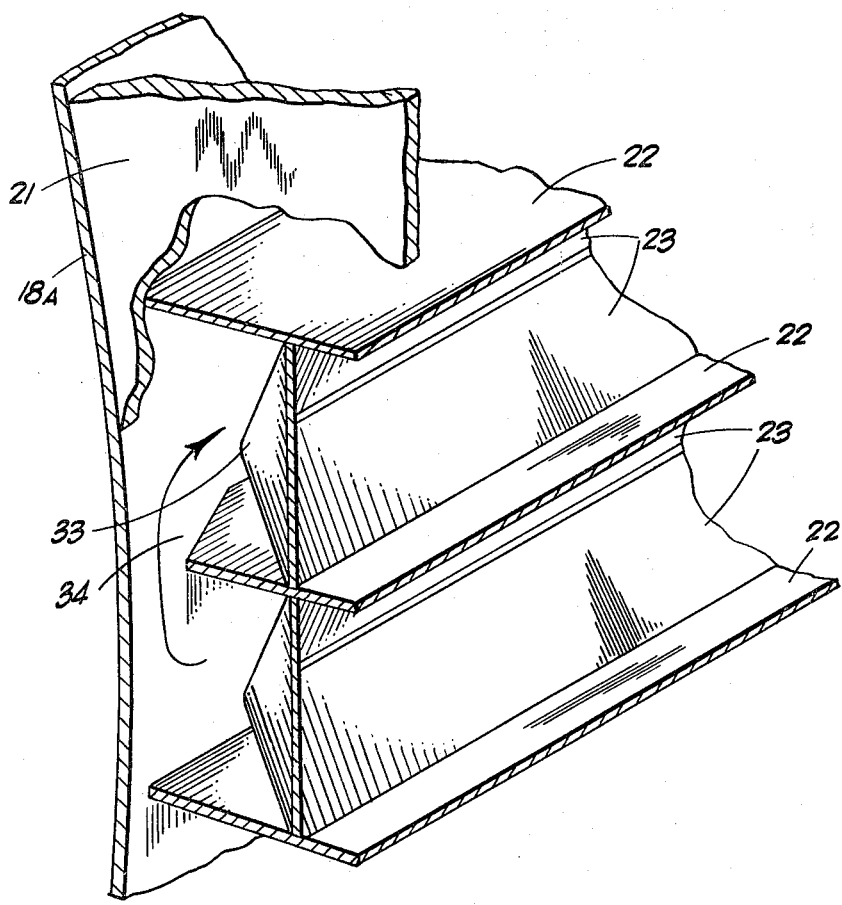

The present invention will be further illustrated by way of the accompanying drawings in which like numerals represent like elements and in which FIGURE 1 is a perspective view of a process vessel according to one embodiment of the present invention;

FIGURE 2 is a section through a side wall of the vessel along the line of 2—2 of FIGURE 1 showing the heat exchange jackets and grid-like reinforcing structure in greater detail and FIGURE 3 is a detail showing the preferred configuration of the heat exchange jacket at one end of the vessel.

Referring to FIGURE 3 to V-shaped breast plate 23 menting vessel 11 comprises an elongated generally loaf-shaped symmetrical steel container 12 of welded construction supported on a rigid box-section frame 13 of spaced-apart intersecting transversely and longitudinally extending I-beams 14 and 15 respectively. Container 12 comprises a flat bottom member 16 welded to the top surface of frame 13, two side walls 17 and 18 each comprising a flat portion 17a and 18a, respectively, extending upwardly from the bottom member 16 and a curved portion 17b and 18b, respectively, which meet to form a dome-like top for the container and two loaf-shaped dished heads 19 and 20 for closing the ends thereof. Heads 19 and 20 each have closeable openings 19a and 20a respectively therein to permit skimming of the fermentation and to facilitate cleaning and inspection of the interior of the vessel 11. Flat portions 17a and 18a extend upwardly from bottom member 16 at an angle preferably between about 90 and 120 degrees therefrom and curved portions 17b and 18b are preferably arcuate adjacent the ends of the container 12. The flat portions 17a and 18a of the side walls 17 and 18 respectively have a plurality of vertically disposed, horizontally spaced strut plates 21 affixed thereto and a plurality of horizontally disposed parallel fin plates 22 extending longitudinally of said container between the strut plates 21. Between each pair of adjacent fin plates 22 is a V-shaped breast plate 23 which forms a pair of parallel triangular passages which are interconnected by suitable openings between the breast plates 23 and the side wall 25 and also through openings in the fin plates 22 so that heat exchange fluid may continuously flow through said passages and as such for the heat exchange jacket in the container 12. In order to allow heat exchange fluid to flow along the whole length of the side wall 23, the triangular passages on either side of the strut plates 21 are interconnected through holes (not shown) in the strut plates 21. Heat exchange fluid is usually introduced through inlet 26 into the lower vent passage and exits through the outlet valve 27 in the uppermost passage.

Referring to FIGURE 3 to V shaped breast plate 23 adjacent both endmost struts 21 in the portion 18a of the side wall 18 of the container 12 has a flared portion 33. The fin plate 22 has a portion 34 thereof cut away alternately against each endmost strut 21. This allows for continuous flow of heat exchange fluid through the jacket on the container 12.

Wort is introduced into the vessel through pipe 28 communicating with opening 29 and beer is withdrawn therefrom when fermentation or primary storage, as the case may be, is completed through pipe 30 communicating with opening 31. The beer may also be removed through a sump 32 in the bottom of the tank adjacent the lower end thereof.

After a fermentation has been completed in the usual manner the temperature of beer is able to be quickly reduced to primary storage temperature by the heat exchange system according to the invention whereupon the beer may then be pumped to separate primary storage tanks or may undergo primary storage under considerable pressure directly in the fermenter.

What we claim as our invention is:

1. A process tank of generally rectangular cross-section, said tank having a metal bottom, a metal top, metal side walls interconnecting the bottom and top, and end members joined to the bottom, side and top walls to form a closed tank, a plurality of vertically extending horizontally spaced reinforcing members secured to said side walls, a plurality of horizontally extending vertically spaced stiffening members extending substantially perpendicularly from said side walls, a plurality of horizontally extending members each of which is fixed along one longitudinal edge thereof to said sidewall and along the opposite longitudinal edge thereof to one said stiffening member to form a heat exchange passage of right triangular cross section, inlet and outlet means for passage of heat exchange fluid through said triangular passages, and closeable openings in said vessel for introducing material therein and for withdrawing material therefrom.

2. A fermenting and aging vessel of generally loaf-shaped cross-section, said tank having a thin metal bottom, a curved thin metal top, thin metal side walls interconnecting the bottom and top and dish-shaped end members joined to the bottom side and top walls to form a closed tank, a plurality of lonigtudinal and transverse beam members disposed beneath said tank to support said bottom wall, a plurality of vertically extending horizontally spaced strut members secured to said side walls and having the lower ends thereof connected to the said transverse beams, a plurality of horizontally extending vertically spaced stiffening members extending substantially perpendicularly from the side walls, a plurality of horizontally extending members a plurality of horizontally extending members each of which is fixed along one longitudinal edge thereof to one said stiffening member to form a heat exchange passage of right triangular cross section, conduits adapted to allow passage of heat exchange fluid through said triangular passages and closeable openings in said vessel for introducing material into the confines thereof and for withdrawing material therefrom.

3. A vessel as claimed in claim 2, wherein the bottom wall is inclined longitudinally thereof.

4. A vessel as claimed in claim 2, wherein the bottom wall is inclined longitudinally thereof and a sump is provided at the lower end of the bottom wall.

5. A vessel as claimed in claim 2, wherein said side walls are arranged at an obtuse angle to the bottom wall and the top wall is substantially semicircular in cross-section.

6. A vessel as claimed in claim 2, wherein there are two horizontally extending angularly connecting members between each pair of horizontally extending stiffening members providing a pair of interconnecting triangular passages.

7. An apparatus as defined in claim 2, wherein at least one external opening is provided in each of the uppermost and lowermost triangular passages and flow passages are provided between the triangular passages so that liquid introduced into one of said uppermost or lowermost passages through said opening will flow to and fro through said triangular passages over said side walls and exit through another of said openings.

8. An enclosed loaf-shaped welded metal fermentation and aging vessel for use in brewing and the like comprising: a flat bottom member having side and end edge portions; a side wall extending upwardly from each side edge portion of said base member, said side walls having a flat portion contiguous to said base member and a curved portion, said curved portions meeting to form a dome-like top for said vessel; a loaf-shaped dished head member closing each end of said vessel; a plurality of vertical strut members affixed in spaced-apart relation longitudinally of the external surface of the flat portion of each said side wall, each said strut member extending from a position adjacent the juncture of the flat and curved portions of the side wall to a position adjacent the said bottom member; a plurality of elongated fin plate members affixed to the flat portion of each side wall extending substantially vertically outwardly therefrom and longitudinally thereof in spaced-apart parallel relation transversely across the said flat portion from approximately the juncture thereof with said curved portion to a position superjacent the said bottom member, said flat plate members and said vertical strut members being rigidly affixed to one another at points of intersection therebetween to form a grid-like reinforcing structure for each side wall; a plurality of elongated flat breast plate members on the flat portion of each said side wall, two each in side by side relationship between adjacent fin plate members, each said breast plate member running longitudinally of the said flat portion of the side wall through openings in some at least of said strut members, said breast plate members being affixed to form a hypotenuse between an adjacent fin plate member and the flat portion of the side wall to form a plurality of heat exchange passages of right triangular cross-section; means for closing the ends of each said heat exchange passage; at least one closeable port in the uppermost and lowermost heat exchange jackets on each side wall; openings in said breast plate members and in said fin plate members for interconnecting adjacent heat exchange passages so that liquid introduced into one of said uppermost or lowermost heat exchange passages through said port will flow to and fro through said plurality of heat exchange passages over the flat portion of said side wall and exit therefrom through another port; and closeable openings in said vessel for introducing material therein and for withdrawing material therefrom.

9. A vessel as claimed in claim 8, wherein said flat portions of said side walls extend upwardly from said bottom member at an angle of between about 90 and 120 degrees therefrom and said curved portions are arcuate to form a substantially semi-cylindrical top for said vessel.

10. A vessel as claimed in claim 8 in which the passages are interconnected by means of cut away openings in the fin plate members alternately adjacent each endmost strut member and both end portions of each breast plate flared away from the side walls into sealing abutment with the endmost strut members.

11. A process tank of generally rectangular cross-section, said tank having a metal bottom, a metal top, metal side walls interconnecting the bottom and top, and end members joined to the bottom, side and top walls to form a closed tank, a plurality of vertically extending horizontally spaced reinforcing members secured to said side walls, a plurality of horizontally extending vertically spaced stiffening members extending substantially perpendicularly from said side walls, a plurality of horizontally extending members on V-shaped cross-section, each of which is fixed along the pair of longitudinal edges thereof forming the arms of said V to vertically adjacent stiffening members and along the longitudinal edge thereof forming the apex of said V to said side wall so as to form a pair of adjacent separate heat exchange passages of right triangular cross-section, inlet and outlet means for passage of heat exchange fluid through said triangular passages and closeable openings in said vessel for introducing material therein and for withdrawing material therefrom.

References Cited by the Examiner

UNITED STATES PATENTS

| 2,675,940 | 4/1954 | Schmitz | 220—71 |
| 3,024,942 | 3/1962 | Schmitz | 220—71 |
| 3,047,190 | 7/1962 | Bayer | 165—169 X |

FOREIGN PATENTS

| 653,205 | 11/1937 | Germany. |
| 673,843 | 3/1939 | Germany. |
| 1,095,865 | 12/1960 | Germany. |

ROBERT A. O'LEARY, *Primary Examiner.*

M. A. ANTONAKAS, *Assistant Examiner.*